R. H. McLAIN.
MOTOR CONTROL SYSTEM.
APPLICATION FILED NOV. 25, 1912.
1,071,770.
Patented Sept. 2, 1913.
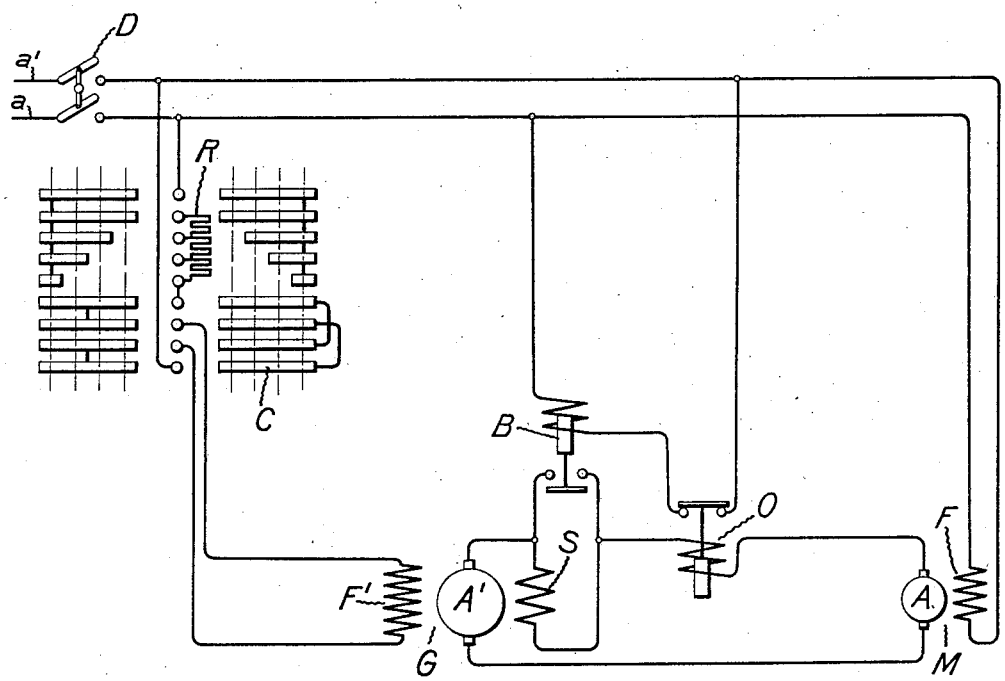
Witnesses
Inventor
Robert H. McLain
by
His Attorney

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

MOTOR-CONTROL SYSTEM.

1,071,770.

Specification of Letters Patent.   Patented Sept. 2, 1913.

Application filed November 25, 1912.  Serial No. 733,275.

*To all whom it may concern:*

Be it known that I, ROBERT H. McLAIN, a citizen of the United States, residing at Schenectady, county of Schenectady, State of New York, have invented certain new and useful Improvements in Motor-Control Systems, of which the following is a specification.

This invention relates to the control of electric motors and has for its object the provision of means whereby an electric motor may be started, stopped and generally controlled in a safe, efficient and simple manner.

My invention relates more specifically to the control of electric motors operating on what is known as the "Ward Leonard system" in which the speed of the motor is controlled by varying the voltage of the generator supplying the motor. In the control of motors on this system care must be taken not to vary the voltage of the generator too rapidly since an overload on the motor circuit may be caused thereby. If during the acceleration of the motor the voltage of the generator is increased too rapidly an overload will be caused by reason of the fact that the motor cannot accelerate rapidly enough to generate a counter-electromotive force sufficient to keep the current within safe limits. Likewise during the retardation, if the voltage of the generator is reduced too rapidly an overload will also occur by reason of the fact that the motor acting as a generator will cause the current to rise above a safe value.

One of the objects of my invention is to provide means for protecting the apparatus from such overloads. In carrying out this object I employ in addition to the shunt field of the generator a series field which is preferably wound differentially with respect to the shunt field. This series field is short circuited during normal operation but the short circuit is opened whenever the current rises above a predetermined value. During the acceleration of the motor, therefore, upon a predetermined rise in current, the series field will be inserted to oppose or "buck" the shunt field and thereby reduce the voltage of the generator and hence the current. The arrangement is such that during acceleration of the overload relay will operate continuously to open and close the short circuit on the series field in response to variations in the current due to the effect of the series field upon the voltage of the generator. Likewise during retardation the series field controlled by the overload relay operates to limit the current to a safe value. In this latter case the current through the series field will be reversed while the current through the shunt field will be in the same direction and the two fields will therefore assist each other to boost the voltage. When, therefore, the current rises above a predetermined value during retardation the voltage will be boosted to oppose the voltage impressed by the motor acting as a generator. In either case the overload relay will operate continuously and rapidly to open and close the short circuit on the series field until the motor reaches a fixed speed.

Other objects and purposes of my invention will appear in the course of the following specification in which I have shown my invention embodied in concrete form for purposes of illustration.

Referring to the drawing which shows my invention diagrammatically in a specific form, A represents the armature of the motor M to be controlled and F the field of the motor which in this case is separately excited from the mains $a\ a'$. A' represents the armature of the generator G for supplying the motor and F'' represents the shunt field of the generator which is also separately excited from the mains $a\ a'$. The strength of this shunt field is varied by means of the resistance R controlled by the controller C in a well understood manner. As thus far described the apparatus constitutes the well known Ward Leonard system of motor control.

S represents a series field for the generator G which is preferably wound differentially with respect to the shunt field F' so that when the series field is in circuit it will oppose or "buck" the magnetism of the shunt field so as to reduce the voltage of the generator. This series field is controlled by an overload relay O connected in the power circuit between the motor and generator. When the current rises above a predetermined value the core of the overload relay will lift and open the short circuit upon the series field. Since the current to be controlled in opening and closing the short circuit of the series field may be, and generally is, quite large, I may employ an electromagnetic switch B which is designed for controlling large currents for opening and closing the circuit. This switch will have its energizing winding connected across the line $a\ a'$ and will be controlled by the overload relay B. The switch B will be closed during normal operation and will be only opened when the current in the overload relay rises above a predetermined value.

The operation of my device is as follows: To start the motor the line switch D is first closed which energizes the field F of the motor and also energizes the winding of the switch B to short circuit the series field S. The controller is now turned in one direction or the other depending upon the rotation of the motor desired to energize the field F' of the generator through the resistance R. If the resistance is cut out of the field of the generator too rapidly, the current in the motor circuit will rise above a predetermined value so as to operate the overload relay O which will cause the switch B to open and insert the series field S. The series field being wound differentially with respect to the shunt field winding F' the voltage of the generator will be reduced and the current correspondingly reduced. The reduction of the current causes the overload relay to close which in turn causes switch B to close to again short circuit the series field. This opening and closing of the short circuit on the series field will continue rapidly until the current reaches normal value. If desired the operator can move the controller to the full on position so as to entirely short circuit the resistance but the overload relay will protect the apparatus by vibrating rapidly and opening and closing the short circuit on the series field until the motor reaches a sufficient speed to bring the motor current down to normal. If now the operator throws the controller handle toward the off position so as to decrease the voltage on the generator too rapidly the motor acting as a generator will cause an excess current as is well understood. As soon as the current rises above a predetermined value the overload relay will operate and open the short circuit on the series field. The current in the series field now, however, is reversed and the magnetism of the series field will therefore assist the shunt field and boost the voltage to oppose the voltage of the motor acting as a generator. This will reduce the current as before and the overload relay will close. The short circuit on the series field will likewise in this case be opened and closed rapidly until the current reaches a normal value. To reverse the direction of rotation of the motor the controller is turned in the opposite direction so as to reverse the current in the field of the generator and the operation will be the same as above described.

With this arrangement it will be seen that a single overload relay controls the circuit for both accelerating and retarding and it would be impossible for the operator to damage the apparatus by attempting to start or slow down too rapidly.

While I have described my invention as embodied in concrete form and as operating in a specific manner for purposes of illustration, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is,—

1. The combination with a separately excited motor, and a generator for supplying current to the armature of said motor, means for varying the voltage of the generator to vary the speed of the motor, a series field for said generator, and an overload relay for controlling said series field.

2. The combination with a separately excited motor and a generator having a shunt field for supplying current to the armature of said motor, means for varying the strength of said shunt field to vary the speed of the motor, a series field for said generator, and an overload relay for controlling said series field.

3. The combination with a separately excited motor and a generator having a shunt field for supplying current to the armature of said motor, means for varying the strength of said shunt field to vary the speed of the motor, a series field for said generator wound differentially with respect to the shunt field, and an overload relay for controlling said series field.

4. The combination with a separately excited motor and a generator having a shunt field winding for supplying current to the armature of said motor, means for varying the strength of said shunt field to vary the speed of the motor, a series field for the generator short circuited during normal operation and differentially wound with respect to the shunt field winding, and an overload relay for opening said short circuit to insert the series winding when the motor current rises above a predetermined value.

5. The combination with a separately excited motor and a generator having a shunt field winding for supplying current to the armature of said motor, means for accelerating and retarding said motor by varying the strength of said shunt field, a series field for the generator short circuited during normal operation and differentially wound with respect to the shunt field winding, and an overload relay responsive to variations in current due to the effect of said series field upon the voltage for continuously opening and closing said short circuit during the accelerating and retarding of the motor.

In witness whereof, I have hereunto set my hand this 22nd day of November, 1912.

ROBERT H. McLAIN.

Witnesses:
 HELEN ORFORD,
 BENJAMIN B. HULL.